(12) United States Patent
Tominaga et al.

(10) Patent No.: US 6,879,420 B2
(45) Date of Patent: Apr. 12, 2005

(54) ACTUATOR FOR SCANNING DETECTING LIGHT

(75) Inventors: Jun Tominaga, Yokohama (JP); Takeo Fukumura, Yokohama (JP); Nobuya Ezure, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 10/088,948

(22) PCT Filed: Jul. 23, 2001

(86) PCT No.: PCT/JP01/06332

§ 371 (c)(1),
(2), (4) Date: Aug. 26, 2002

(87) PCT Pub. No.: WO02/08818

PCT Pub. Date: Jan. 31, 2002

(65) Prior Publication Data

US 2003/0035188 A1 Feb. 20, 2003

(30) Foreign Application Priority Data

Jul. 24, 2000 (JP) ........................................ 2000-221620
Dec. 8, 2000 (JP) ........................................ 2000-374215

(51) Int. Cl.⁷ .............................................. G02B 26/08
(52) U.S. Cl. ........................ 359/224; 359/198; 359/199; 359/223
(58) Field of Search ................................ 359/196, 198, 359/199, 212, 223, 224, 226; 310/36, 40 R, 46; 250/234–236

(56) References Cited

U.S. PATENT DOCUMENTS 6,108,118 A * 8/2000 Minamoto ............... 359/224
6,327,066 B2 * 12/2001 Takishima et al. .......... 359/198

FOREIGN PATENT DOCUMENTS

JP          6-331908        * 12/1994

* cited by examiner

Primary Examiner—James Phan
(74) Attorney, Agent, or Firm—MacPherson Kwok Chen & Heid LLP; David S. Park

(57) ABSTRACT

Provided is an actuator for scanning detecting light, comprising an optical element for emitting detecting light, a moveable part supporting the optical element, a sheet spring having a fixed end and a moveable end supporting the moveable part; and drive means for driving the moveable part so as to scan the detecting light. Thus, a spring-mass system is formed in which the moveable part retaining the optical device acts as the mass, and the first order resonant frequency of the system may be selected so as to be higher than the operating frequency (scanning frequency). A bearing for a sliding part is not required, and the resistance loss can be thereby eliminated. These factors contribute to a favorable responsiveness. Also, by properly designing the sheet spring, a lighter and more compact design is enabled than would be possible with the conventional arrangement. A plurality of drive force generating units disposed on either side of the optical element in such a manner that the combined force of the drive force produced by the drive force generating units acts substantially onto the gravitational center of the moveable part. Thus, the drive efficiency can be improved while saving energy and achieving a high level of responsiveness.

16 Claims, 13 Drawing Sheets

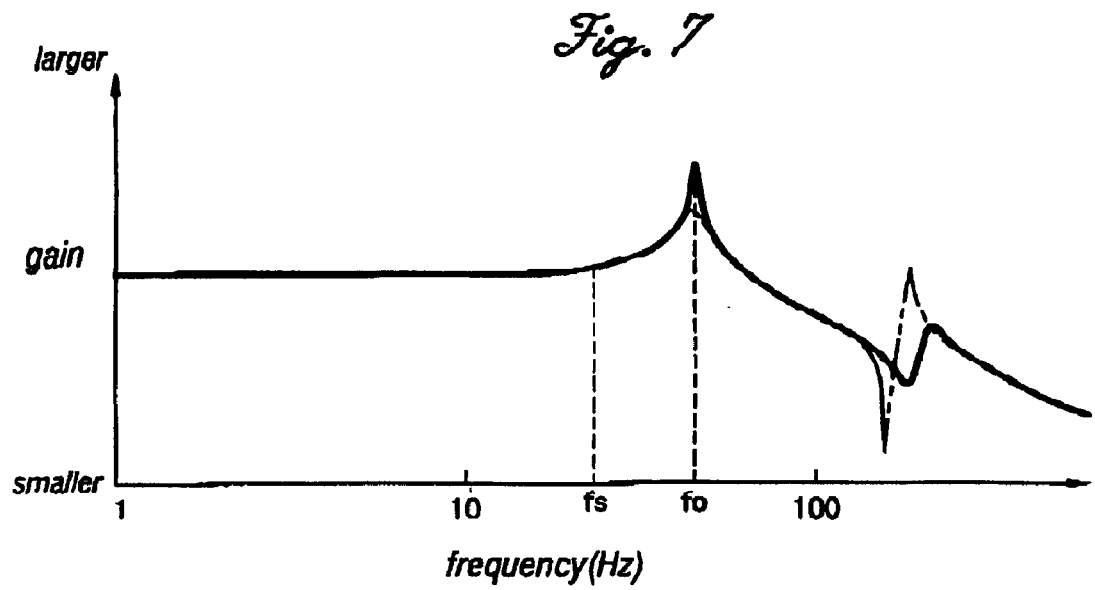
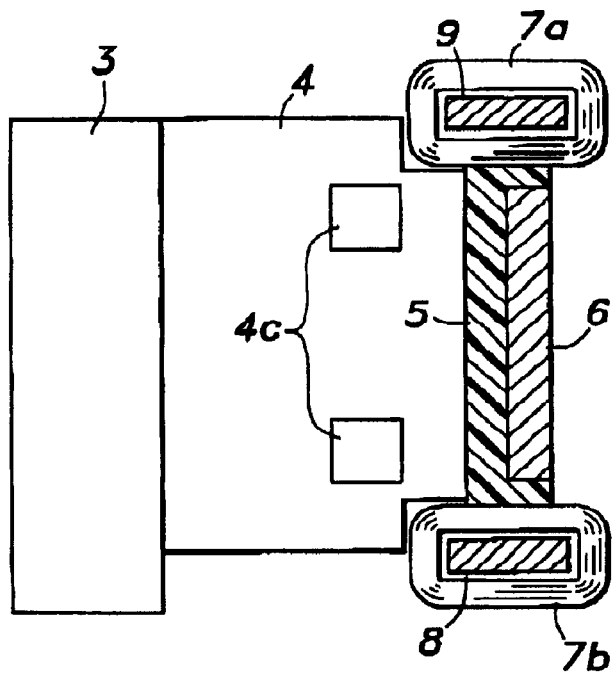

ACTUATOR FOR SCANNING DETECTING LIGHT

TECHNICAL FIELD

The present invention relates to an actuator for scanning a detecting light beam which is suitable for use in a scanning device for scanning a detecting light beam such as a laser radar.

BACKGROUND OF THE INVENTION

Conventionally, various forms of scanning devices for scanning a detecting light beam are known, such as scan type laser radars, laser scanners, laser printers, laser markers and object monitoring devices. Among such devices, actuators for scanning a detecting light beam used in scan type laser radars for preventing a vehicle crash include those impinging a light beam onto a point on a polygonal mirror which is rotated by a motor and using the light beam reflected by the polygon mirror as a detecting light beam (FIG. 21), and those using a single moveable mirror turned or swung by a motor to reflect a light beam impinged thereonto from a laser light source to scan the light beam by reflection as a detecting light beam (FIG. 22) (see Japanese patent laid open publication No. 03-175390 and Japanese patent laid open publication No. 07-92270).

The polygon mirror type device illustrated in FIG. 21 includes a polygon mirror 31 which is rotatively driven by an electric motor 32, and a fixed reflective mirror 34 which directs a laser beam LB emitted from a laser diode 33 onto a point on the polygon mirror 31 so that the reflected laser beam may be scanned as the different reflective surfaces of the polygon mirror pass this point.

Such a polygon mirror type device is capable of a high speed scanning, but is both high is cost and large in size because a bearing is required for a sliding part that rotatably supports the mirror as well as an electric motor for swinging or rotating the mirror.

The single mirror type device illustrated in FIG. 22 includes a single moveable mirror 35 which is cyclically swung by an electric motor 36. Laser light emitted from a laser diode 37 is impinged upon the moveable mirror 35 to scan the laser beam LB reflected by the moveable mirror. In this case, the moveable mirror is typically swung in a cyclic manner by using a cam driven by a motor.

Such a single mirror type device is suitable for compact design, and costs less than a polygon mirror type device, but the need for a bearing for rotatably supporting the mirror and an electric motor for driving the mirror thereof prevents a reduction in cost. In particular, the need to rotate a single mirror prevents an increase in the scanning speed. and the need to swing a single, mirror prevents achievement of both compact design and high frequency drive because of the problems associated with inertia and drive torque.

BRIEF SUMMARY OF THE INVENTION

To eliminate such problems, and provide an economical and compact actuator for scanning a laser beam capable of a high speed scanning, the actuator of the present invention comprises an optical element for emitting detecting light; a moveable part supporting the optical element; a sheet spring having a fixed end and a moveable end supporting the moveable part; and drive means for driving the moveable part so as to scan the detecting light.

According to this arrangement, a spring-mass system is formed in which the moveable part retaining the optical device acts as the mass, and the first order resonant frequency of the system may be selected higher than the operating frequency (scanning frequency), A bearing for a sliding part is not required. and the resistance loss can be thereby eliminated. This contributes to a favorable responsiveness. The optical element for emitting detecting light is not limited to devices for emitting such light by themselves, but may also consist of any device for changing the light path of the detecting light emitted from detecting light emitting means to a desired direction.

The drive means may be provided with a plurality of drive force generating units disposed on either side of the optical clement in such a manner that the combined force of the drive force produced by the drive force generating units acts substantially onto the gravitational center of the optical element and moveable part. Thus. undesirable behaviors resulting from an imbalance in moments can be avoided, and the drive efficiency can be improved while saving energy and achieving a high level of responsiveness.

When the drive means consists of an electromagnetic force generating unit, an electromagnetic coil which is a relatively light part of the electromagnetic force generating unit may be provided on the moveable part so that the mass of the moveable part may be minimized.

The optical element may comprise a mirror for reflecting detecting light emitted from laser light emitting means. The mirror may consist of a single mirror and a reflective surface thereof may be swung through a swinging motion of the sheet spring so that the scanning of the detecting light can be accomplished with a simple structure.

The optical element may comprise a prism for refracting detecting light emitted from detecting light emitting means. In this case, the incident and exit angles of the detecting light into and out of the optical element can be freely selected by appropriately designing the shape of the prism, and this contributes to the increase in the freedom in the layout and compact design of the actuator for scanning detecting light.

A similar effect can be obtained even when the optical element comprises a hologram element for reflecting detecting light emitted from detecting light emitting means, If the optical element comprises a detecting light emitting device, detecting light can be emitted directly from the moveable part, and the part surrounding the movable part can be made highly compact because there is no need for detecting light emitting means to be provided outside the moveable part.

If the sheet spring is connected to a fixed part via a flexible circuit board including a circuit for supplying electric current to the electromagnetic coil, the flexible circuit board provides a damping action to the sheet spring.

If the sheet spring is provided with a laminated structure including an electrically insulating layer and an electrically conductive layer serving as. a circuit for supplying electric current to the electromagnetic coil, the circuit for supplying electric current to the electromagnetic coil can be formed at the same time as forming the sheet spring, and the wiring work is thereby simplified.

Also, by affixing 3 viscoelastic sheet or other vibration control material to a part of the sheet spring demonstrating a relatively high strain at the time of resonance, the resonance property can be favorably controlled at low cost and without substantially increasing the mass of the system.

The drive means may consist of an electromagnetic force generating unit, and the sheet spring may comprise a plurality of sheet spring members disposed one next to another in a major plane of the sheet spring members with the electromagnetic force generating unit disposed between the sheet spring members. in this case, by arranging the sheet spring so that the electromagnetic force generating device acts substantially upon the gravitational center of the moveable part, and the drive force is applied substantially to the gravitational center of the moveable part, It is possible to prevent undesirable behaviors due to the imbalance in moments from occurring. For instance, the number of component parts and the mass of the core can be reduced and a more compact and light-weight design is made possible as compared to the arrangement in which a pair of electromagnetic force generating devices are arranged above and below the single sheet spring member in a symmetric manner.

If each of the sheet spring members has a width which gets narrower from the fixed end to the moveable end, the stress can be distributed substantially uniformly over the sheet spring, and the space for accommodating the electromagnetic force generating unit can be favorably ensured.

If the electromagnetic force generating unit comprises an electromagnetic coil attached to the moveable part while the coil receives a supply of electric current via a circuit partly formed by the sheet spring members, the need for an extra wiring arrangement for the electromagnetic coil of the moveable part can be eliminated. Therefore, any adverse effect such a wiring arrangement may have on the spring property can be avoided while the number of component parts can be reduced, and the durability of the wiring arrangement can be improved.

If the electromagnetic force generating unit comprises a yoke attached to the fixed part, and the yoke includes a C-shaped member which is folded onto itself to define a gap for receiving the electromagnetic coil, the manufacturing process can be simplified.

Preferably, the electromagnetic coil is provided with an annular shape, and the yoke is attached to the fixed part so as to extend along the direction of movement of the movable part and partly fitted into the electromagnetic coil, the fixed part being provided with a guide part for guiding the yoke when fitting the yoke into the electromagnetic coil along the direction of movement of the moveable part and attaching the yoke to the fixed part. This arrangement simplifies the assembling work for the yoke.

BRIEF DESCRIPTION OF THE DRAWINGS

Now the present invention is described in the following with reference to the appended drawings, in which;

FIG. 2 is a schematic perspective front view showing an essential part of the scan unit 1a;

FIG. 3 is a schematic perspective rear view showing an essential part of the scan unit 1a;

FIG. 4 is an exploded perspective view showing an essential part of the scan unit 1a;

FIG. 7 is a diagram showing the relationship of the scanning frequency to the fist order resonant frequency;

FIG. 8 is a vertical sectional view of the moveable part given as a modification of the first embodiment;

FIG. 16 is a schematic perspective rear view showing an essential part of the scan unit 21a;

FIG. 17 is a plan view showing an essential pan of the scan unit 21a;

FIG. 19 is a perspective view showing the structure of the arcuate yoke 28 of the scan unit 21a;

FIG. 20 is a view similar to FIG. 17 showing the mode of assembling: the arcuate yoke 28 of the scan unit 21a;

DETAILED DESCRIPTION OF THE PREFERRED EMBODIMENTS

Now the present invention is described in the following in more detail in terms of a concrete embodiment with reference to the appended drawings.

Figure 1:
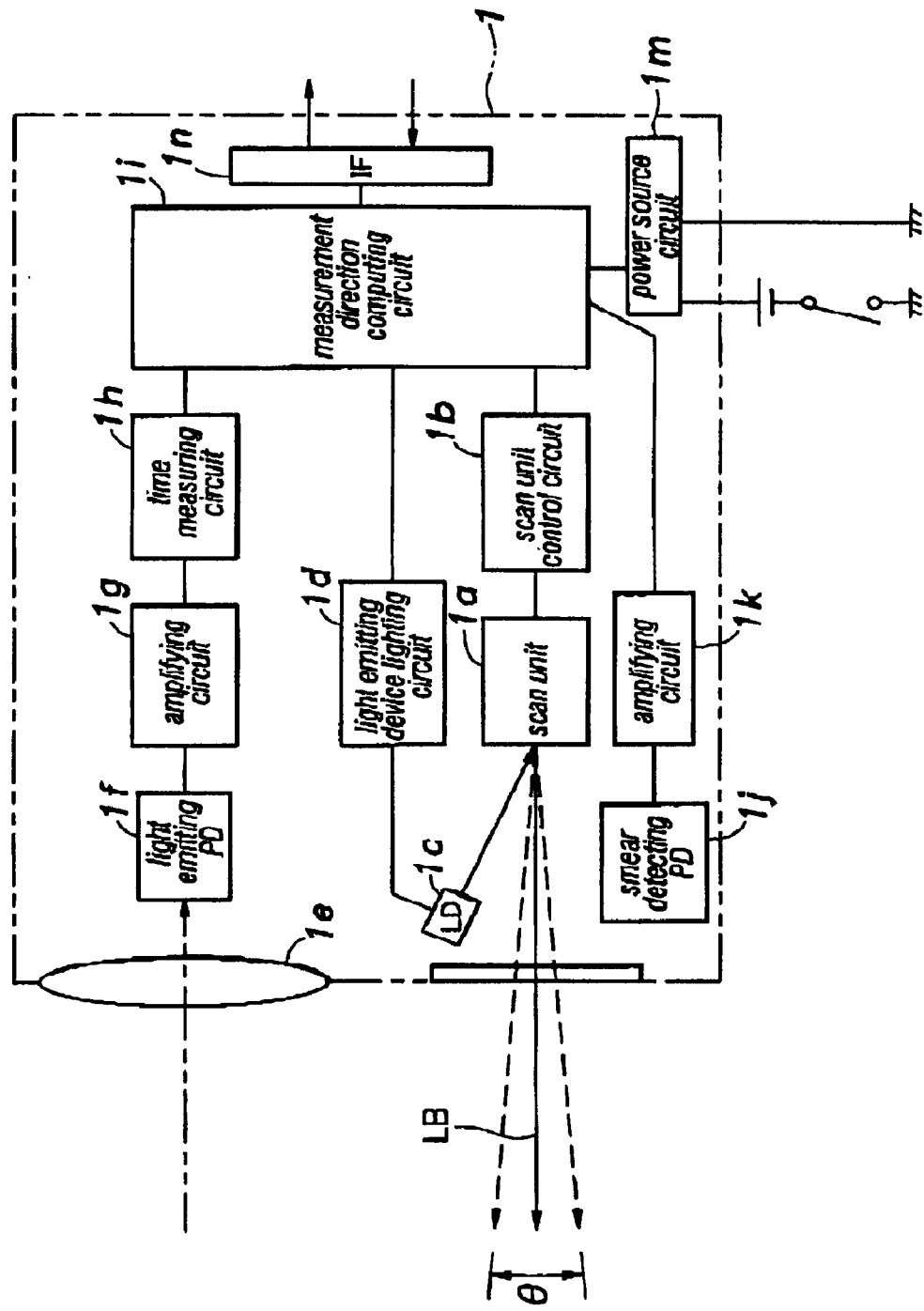
FIG. 1 is a general block diagram of the scan type laser radar unit 1 for a vehicle crash prevention system embodying the present invention.

FIG. 1 is a block diagram of a scan type laser radar unit for a vehicle crash prevention system embodying the present invention. The scan type laser radar unit 1 is mounted, for instance, in a front part of a vehicle. The scan type laser radar unit 1 is incorporated with a scan unit 1a consisting of a laser actuator, a scan unit control circuit 1b for controlling the scan unit 1a, a laser diode 1c serving as a laser light emitting means for the scan unit 1a, and a light emitting element lighting circuit 1d for controlling the laser diode 1e. The laser light beam from the laser diode 1c is directed outward as a laser light beam scanned by the scan unit 1a, and any reflected detecting light beam, for instance, reflected by an object ahead of the vehicle is received by a photodiode 1f via a condenser lens 1e.

The signal detected by the photodiode 1f is amplified by an amplifying circuit 1g and is then forwarded to a time measuring circuit 1h. The output signal of the time measuring circuit 1h is forwarded to a measurement direction computing circuit 1i. The measurement direction computing circuit 1i is connected to a scan unit control circuit 1b, a light emitting device lighting circuit 1d, an amplifying circuit 1k for a smear detection sensor 1j, a power source circuit 1m and an interface circuit 1n. The interface circuit 1n allows the measurement direction computing circuit 1i to exchange signals with other control units such as alarm displaying means and alarm sound emitting unit.

Figure 2:
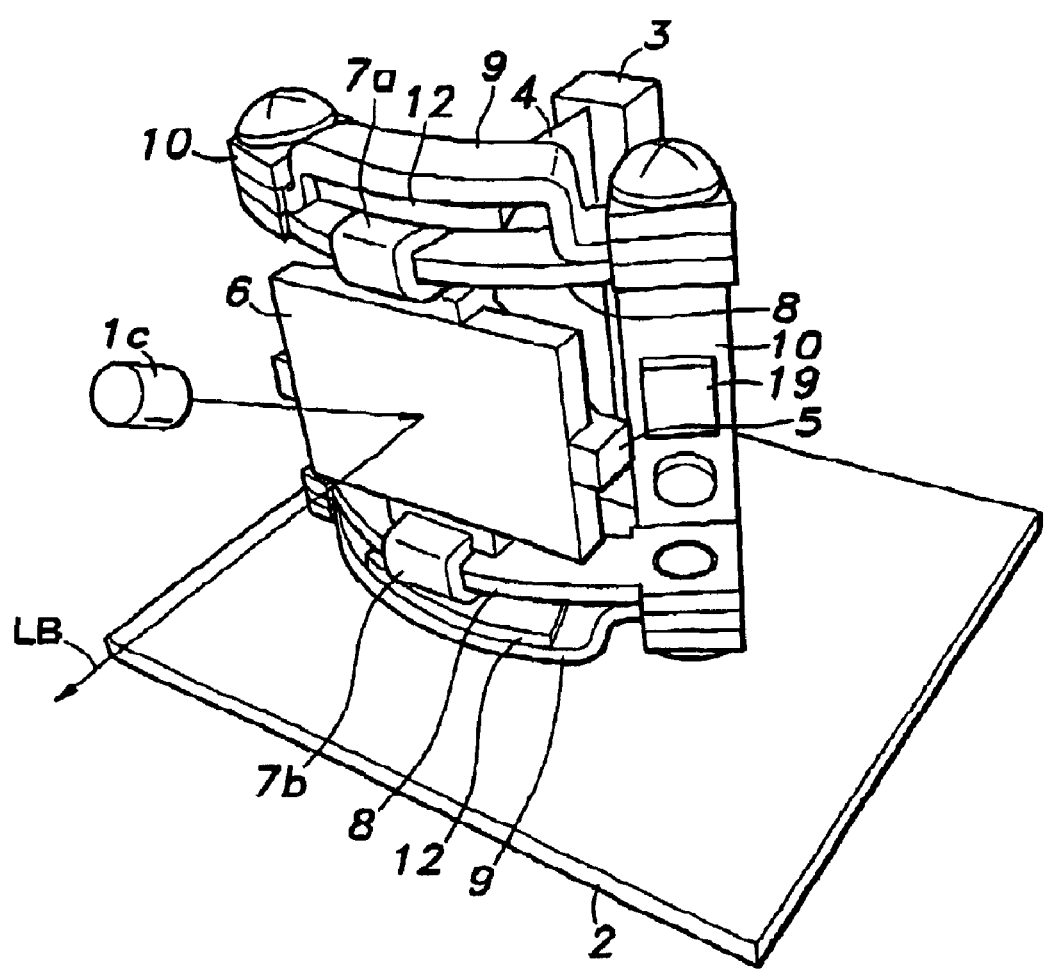
Figure 4:
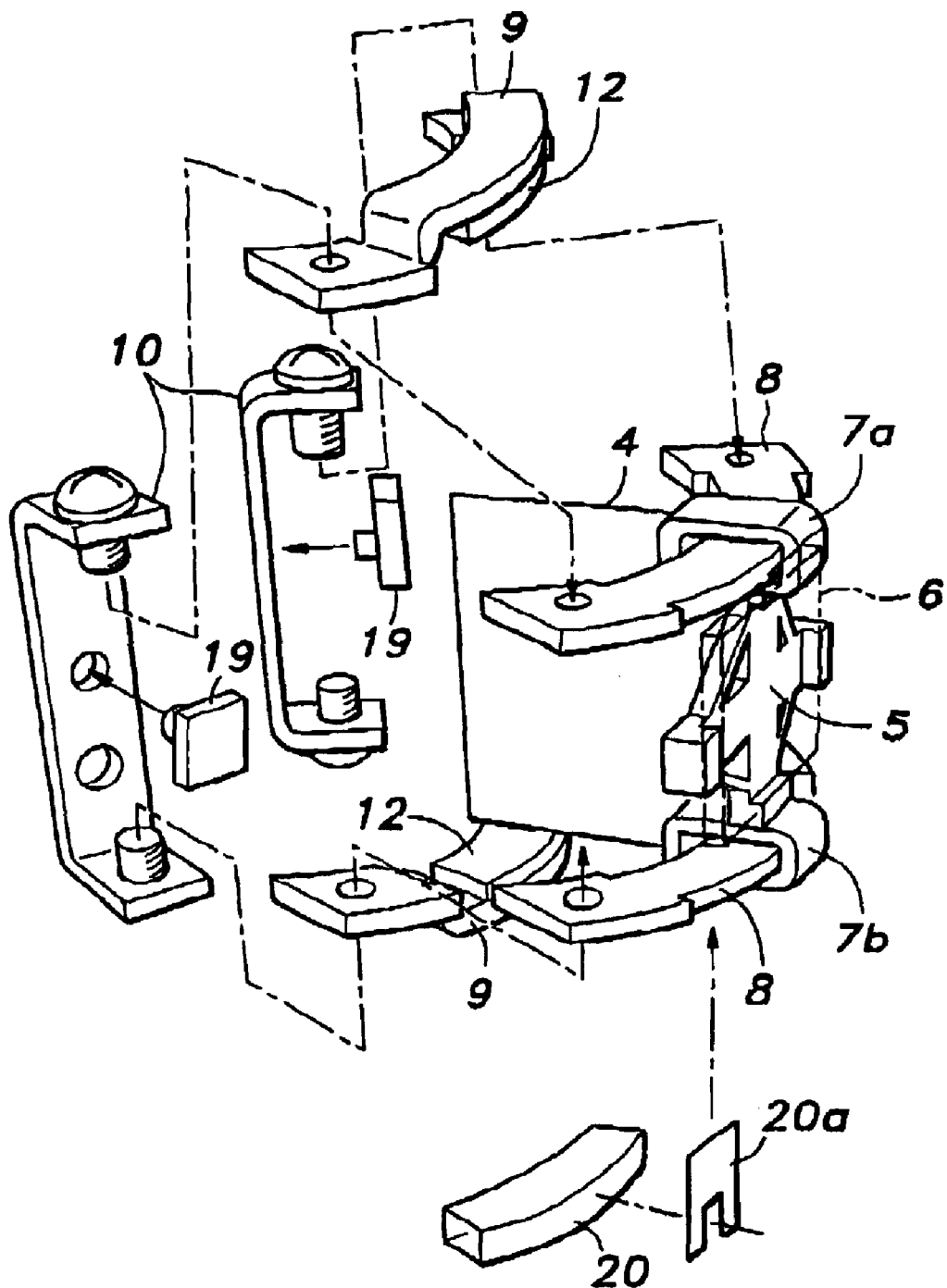

FIG. 2 is a schematic perspective front view of an essential part of the scan unit 1a, and FIGS. 3 and 4 are schematic perspective rear view and exploded perspective view of the same, respectively.

Referring to these drawings, a rectangular post 3 stands upright on a plate-shaped base 2 which is adapted to be attached to a casing of the scan type laser radar unit 1, and supports a base end of a sheet spring 4 having a major surface extending along the axial line of the rectangular post 3. A free end of the sheet spring 4 remote from the rectangular post 3 fixedly carries a moveable part consisting of a mirror holder 5. The mirror holder 5 retains a mirror 6 extending perpendicularly with respect to the major surface of the sheet spring 4.

The mirror 6 reflects the laser light from the laser diode 1c to the outside as shown in FIG. 1, and may consist of glass, plastic or light metallic material such as aluminum. The surface (mirror surface) of the mirror 6 is provided with a reflective layer, for instance formed by depositing aluminum, having a smooth surface The surface of the reflective layer is coated by a protective layer consisting of $SiO_2$ or other thin film for the protection against corrosion and oxidization.

Figure 5:
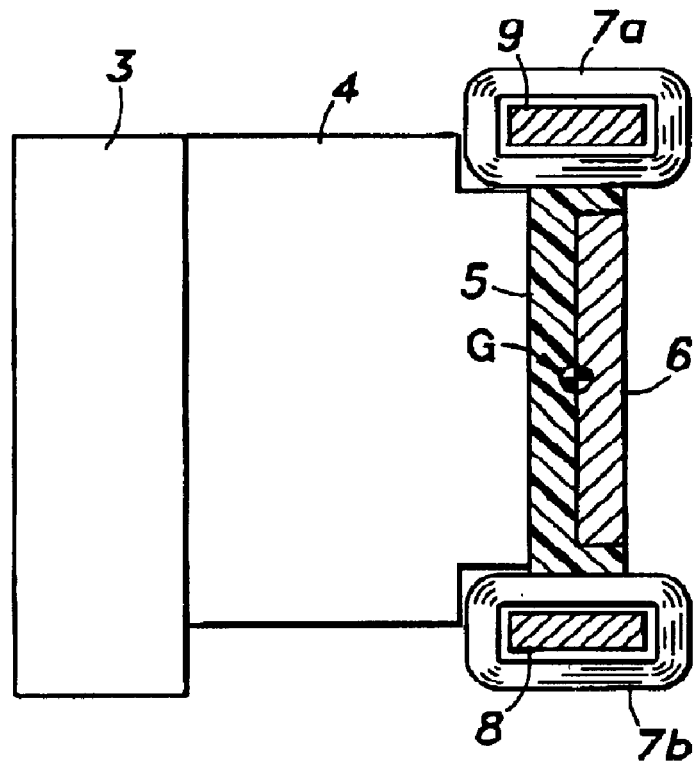
FIG. 5 is a vertical sectional view showing the moveable part.

The mirror holder 5 fixedly carries thereon a pair of electromagnetic coils 7a and 7b forming a part of a drive means consisting of an electromagnetic force generating unit at upper and lower parts thereof (as seen in the drawing), respectively, by using a bonding agent. The two electromagnetic coils 7a and 7b are disposed symmetric about the center of the reflective surface of the mirror 6. as well as about the gravitational center G of the moveable part which includes the mirror 6, mirror holder 5 and electromagnetic coils 7a and 7b as shown in FIG. 5.

A pair of arcuate yokes 8 passing through the two electromagnetic coils 7a and 7b at upper and lower parts, respectively, and associated yokes 9 each having a recessed part are integrally attached to yoke brackets 10 by threaded bolts each at either end thereof, and the yoke brackets 10 are in turn attached, by threaded bolts, to a yoke mounting part 11 standing upright from the base 2. These yokes 8 and 9 may be formed by stamp forming soft magnetic member consisting of such materials as pure iron.

A magnet 12 is fixedly attached to the recessed part of each of the arcuate yokes 9 opposite to the corresponding arcuate yoke 8. Therefore, a magnetic flux extends between each of the magnets 12 and the corresponding arcuate yoke 8, and the corresponding electromagnetic coil 7a or 7b moves in the direction to cut the magnetic flux as electric current is supplied to the electromagnetic coil 7a or 7b. Each of the electromagnetic coils 7a and 7b in this case consists of approximately 100 turns of copper wire wound without using a core. The material. shape and dimensions of each of the magnets should be selected appropriately so as to produce a required magnetic flux and produce an adequate drive force in cooperation with the corresponding electromagnetic coil 7a or 7b. These components form the magnetic circuit.

The drive force produced by this magnetic circuit causes a swinging (scanning) motion to the mirror holder 5 (mirror 6) about the pivot point at which the sheet spring 4 is supported by the rectangular post 3. Because the electromagnetic coils 7a and 7b are disposed symmetrically about the gravitational center G of the moveable part as mentioned earlier, and the combined drive force of the electromagnetic coils 7a and 7b acts upon the gravitational center, the drive efficiency is improved, and undesirable behaviors which are otherwise caused by the imbalance in moments can be avoided. Also, because the electromagnetic coils 7a and 7b which are relatively light among the components of the electromagnetic force generating unit are provided on the moveable part, the responsiveness and power efficiency can be both improved.

When molding the mirror holder 5 with plastic material, the mirror 6 and electromagnetic coils 7a and 7b may be insert molded at the same time. In such a case, the bonding process can be eliminated, and the production process can be favorably simplified. The mirror holder 5 preferably consists of a light weight and high rigidity structure as a moveable part, and therefore consists of a frame structure made by injection molding engineering plastic such as LCP (liquid crystal polymer) and FPS (polyphenylene sulfide) filled with glass fibers so as to define empty parts as illustrated in the drawings.

The sheet spring 4 may be formed by stamp forming a thin plate member made of beryllium copper, phosphorus copper or stainless steel. The shape of the sheet spring 4 is selected so as to make the first order resonant frequency of the moveable part (mirror holder 5) higher than the scanning frequency, and control the stress of the sheet spring 4 in use below the fatigue limit of the material. Thus, the durability of the sheet spring against repeated stress can be ensured.

The rectangular post 3 serving as a fixed part fixedly retains the sheet spring 4, and can be made by injection molding engineering plastic such as LCP (liquid crystal polymer) and PPS (polyphenylene sulfide) filled with glass fibers. The sheet spring 4 may be attached to the rectangular post 3 by using a bonding agent or by mechanically attaching it to the rectangular post 3. Also, the sheet spring 4 and electromagnetic coils 7a and 7b may be insert molded when injection molding the rectangular post 3 and mirror holder 5. In such a cage, the bonding process can be eliminated, and the production process can be significantly simplified.

Figure 6:
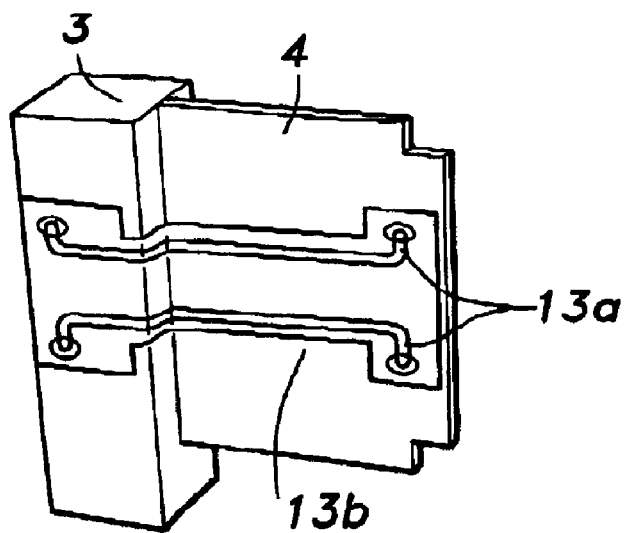
FIG. 6 is a fragmentary perspective view of the sheet spring and an associated part using a flexible printed circuit board.
Figure 9:
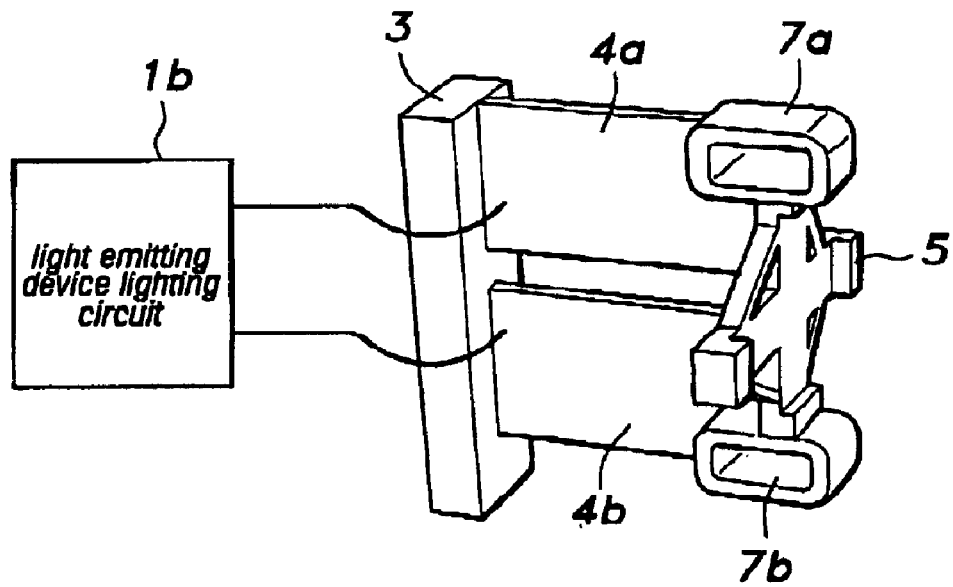

Referring to FIG. 6, a flexible printed circuit board 13 comprising an electroconductive pattern 13a for electrically connecting the scan unit control circuit 1b to the electromagnetic coils 7a and 7b is bonded entirely over the sheet spring 4. A part of the flexible printed circuit board 13 is bent into a crank shape, and is fixedly attached to the rectangular post 3 by using a bonding agent. Because the rectangular post 3 and sheet spring 4 are attached to each other via a resilient member (a part of the flexible printed circuit board 13), the moveable part can be given with an appropriate damping action by selecting the material, thickness and shape of the flexible printed circuit board 13. Therefore, the electromagnetic coils 7a and 7b are not required to produce a large braking force at each point of reversing the swinging motion, and this contributes to the saving of the electric power consumption and the increase in responsiveness.

A stopper 19 made of resilient material such as rubber is attached to each of the yoke brackets 10 by using a bonding agent or other fastening means to limit the scanning angle (θ) of the moveable part in case an excessive current is supplied to the electromagnetic coils 7a and 7b. When the moveable part (such as the mirror 6) has rotated more than is required, each of the stoppers 19 engages a part of the corresponding mirror holder 5, and limits the maximum rotational angle thereof. Thus, the moveable part is prevented from swinging excessively.

According to the scanning type laser radar unit 1 incorporated with the scan unit 1a described above, the laser diode 1c consists of a near infrared (having a wavelength in the order of 900 nm) pulse laser diode, and produces light pulses each having a duration in the order of a few $\mu$m according to the control signal from the light emitting device lighting circuit 1d. The laser light from the laser diode 1c is reflected by the mirror 6 of the scan unit 1a, and is emitted to the outside as a laser beam LB.

The two electromagnetic coils 7a and 7b receive a supply of electric current corresponding to the control signal from the scan unit control circuit 1b. and the mirror holder 5 (mirror 6) swings about the axial line of the rectangular post 3 according to the polarity and amplitude of the electric current. As the angle of the reflective surface of the mirror 6 changes, the laser beam LB emitted to the outside as a reflected light beam undergoes a scanning or sweeping action. The electric current typically consists of an alternating current having a frequency in the order of 30 Hz.

An arcuate sensor 20 extends between the two yoke brackets 10 to detect the origin and angle of the minor holder 6, and a corresponding sensing plate 20a is attached to the lower electromagnetic coil 7b, for instance. The sensor 20 provides such information as the swing angle (scanning angle), angular position (absolute value), angular speed and operating frequency. Therefore, both the distance information (which can be computed from the state of the received pulsed laser beam) and angular information can be obtained, and it can be used for accurately detecting the position of a vehicle which could cause a vehicle crash The sensor 20 and sensing plate 20a may consist of a contact-less optical or magnetic encoder.

The scan unit 1a serving as a laser actuator forms a spring-mass swing, and is given with a first order resonant frequency $f_0$ which is higher than the operating frequency (scanning frequency) $f_s$ to achieve a favorable responsiveness as shown in FIG. 7.

A modification of the first embodiment is described in the following. FIG. 8 is a view similar to FIG. 5 showing the modification of the first embodiment, and the description of the remaining parts is omitted as they are similar to those of the previous illustrated embodiment.

In this example, a film strip 4c for damping made of polymer material having a damping property is affixed to a part of the sheet spring 4 which is subjected to a relatively large strain at the time of the second-order resonant vibration mode of the sheet spring 4. This position is typically found near the free end of the sheet spring 4 or the upper and lower positions near the electromagnetic coils 7a and 7b, and the size, position and material of the film strip 4c are selected so that a desired damping effect is produced. This controls the resonance peak of the second order resonance mode as indicated by the solid line in FIG. 7, and prevents the destruction of the device due to resonant vibrations and the induction of spurious vibrations due to external interferences. Also, the electromagnetic coils 7a and 7b are not required to produce a large braking force at each point of reversing the swinging motion so that the energy consumption can be minimized, and a high level of responsiveness can be achieved. The imaginary line on the right hand side of FIG. 7 shows the response that is produced when the film strip 4c is not affixed.

When a vibration control member is attached to the sheet spring 4 near the base end thereof, the first-order resonance mode can be also controlled as indicated by the imaginary line in the central part ($f_0$) of FIG. 7. Instead of using a film strip 4c having a damping property, viscoelastic material in the form of gel may be applied to an appropriate part of the sheet spring. By thus selectively applying a vibration control member to a suitable part, a desired frequency response can be obtained without increasing the mass of the system.

Figure 9:
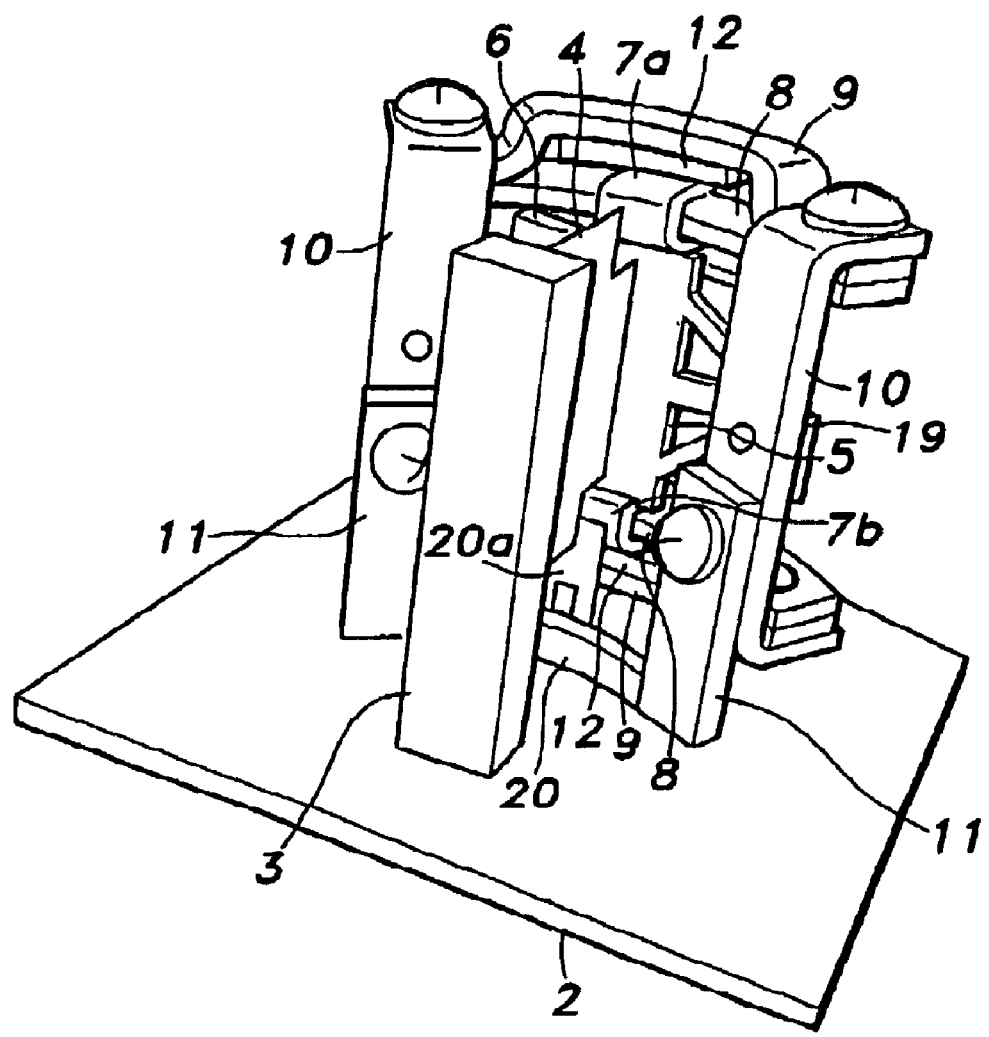
FIG. 9 is a fragmentary sectional view of the sheet spring given as a modification of the first embodiment.

Another modification of the first embodiment is described in the following. FIG. 9 is a schematic perspective view of an essential part of the sheet spring given as a modification of the first embodiment, and the remaining parts are omitted from the description as they may be similar to those of the previous illustrated embodiment.

According to this embodiment, the sheet spring 4 of the previous embodiment is divided into upper and lower parts 4a and 4b, one end of each of the two parts 4a and 4b of the sheet spring is supported by the rectangular post 3 independently, and a mirror holder 5 is supported by the other ends of the two parts of the sheet spring 4. The sheet spring 4 may be likewise formed by stamp forming a thin plate member made of beryllium copper, phosphorus copper or stainless steel, and can be used as electric leads for the electromagnetic coils 7a and 7b. This simplifies the electric current supply circuit. The shape of the sheet spring 4 is selected so that the first order resonant frequency of the moveable part (the part of the mirror holder 5) is higher than the scanning frequency and the stress of the spring in operation is below the fatigue limit.

The sheet spring parts 4a and 4b should be given with a damping action by using suitable means. For instance, a polymer film strip having a damping property may be attached to the sheet spring parts 4a and 4b or a viscoelastic member in the form of gel may be applied to the sheet spring parts. If a sensor signal is required to be obtained from the moveable part, a flexible printed circuit board may be used. In such a case, the flexible printed circuit board may be given with a damping capability, and an additional damping structure may be omitted.

Figure 10:
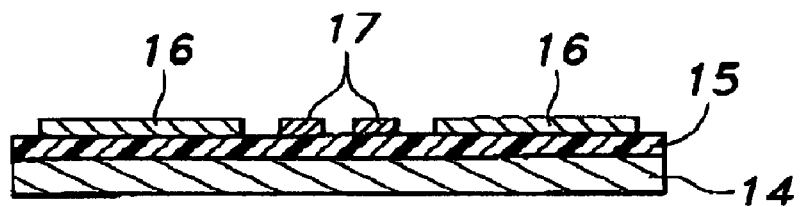
FIG. 10 is a cross sectional view of the sheet spring given as a modification of the first embodiment.

FIG. 10 is a cross sectional view of yet another modification of the sheet spring given as a third embodiment of the present invention. In this embodiment, the sheet spring consists of a thin sheet spring 14 and forms a three layer structure by additionally comprising an electrically insulating layer 15 formed on the thin sheet spring 14, and an electroconductive layer 16 for supplying electric current to the electromagnetic coils 7a and 7b and a sensor signal conducting layer 17 for conducting electric current for a sensor provided on the moveable part both formed on the electrically insulating layer 15. This arrangement eliminates the need to form an electric current find circuit using lead wire, and the wiring work can be simplified. If the sensing plate is formed on the moveable part as was the case with the previous embodiments, the sensor signal conducting layer 17 would not be required.

Figure 11:
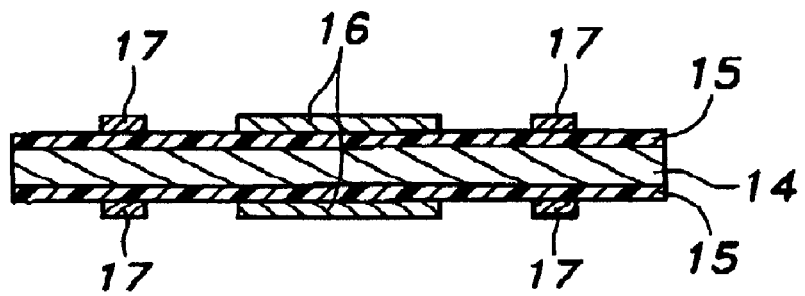
FIG. 11 is a view similar to FIG. 9 showing a modification of the first embodiment.

FIG. 11 is a view similar to FIG. 9 showing yet another modification of the first embodiment of the present invention, and the sheet spring consists of a thin sheet spring 14. A five layer structure is formed by a pair of electrically insulating layers 15 formed on either side of the thin sheet spring 14, and an electroconductive layer 16 and a sensor signal conducting layer 17 formed on the surface of each electrically insulating layer 15. This embodiment provides a similar effect as that of the embodiment shown in FIG. 10. As compared to the three layer structure, the number of conductive paths can be readily increased and a finer control of the electromagnetic coils 7a and 7b is enabled by individually controlling the electric current supplied to each of the coils. It is also possible to increase the number of electromagnetic coils 7a and 7b to four, twice that of the illustrated embodiment. Also, according to the five layer structure, because the layers are arranged symmetrically about the thin sheet spring 14, a more favorable balancing of the spring property and damping property of the thin sheet spring is enabled as compared to the three layer structure.

The electrically insulating layers 15, electroconductive layer 16 and sensor signal conducting layer 17 may be formed by etching, pressing and punching appropriate materials similar to those used for the flexible circuit board 13 in a manner suitable for mass production.

The thin sheet springs 14 used in the embodiments illustrated in FIGS. 10 and 11 may be made by pressing and punching thin spring material such as beryllium copper, phosphorus copper or stainless steel, and the shape of the sheet spring 14 is selected so as to make the first order resonant frequency of the moveable part (mirror holder 5) higher than the scanning frequency, and control the stress of the sheet spring in use below the fatigue limit of the material.

Figure 12:
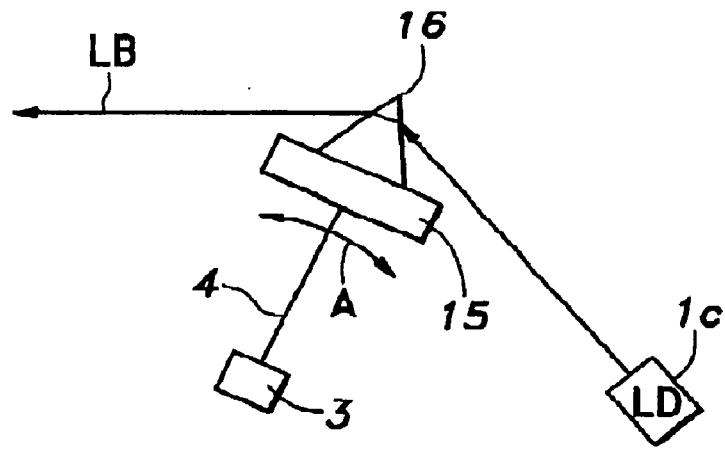
FIG. 12 is a diagram showing an embodiment using a prism as the optical element.

Referring to FIG. 12, a moveable holder 15 may be provided to support a prism 16 instead of the mirror holder 5 which supported the mirror 6 in the foregoing embodiments. This arrangement also allows the light emitted from the laser diode 1c to project a laser beam LB in a similar manner as those of the foregoing embodiments via the prism 16. At the same time, the moveable holder 15 (the prism 16) is made to undergo a swinging motion as indicated by arrow A to scan the laser beam LB. This embodiment also provides a similar effect. Because the swinging angle of the moveable holder 15 can be relatively reduced for the given scanning angle θ that is required for the laser beam LB emitted via the prism 16. Therefore, the laser beam LB can be scanned by using a relatively small power, and this contributes to a compact design and a lower power consumption.

Figure 13:
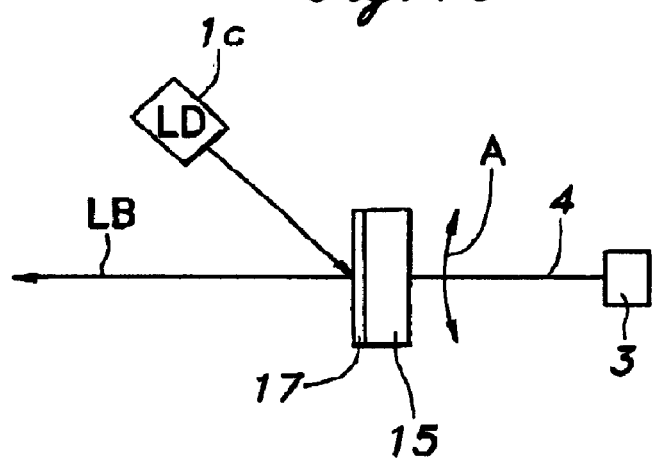
FIG. 13 is a diagram showing an embodiment using a hologram as the optical element.

Referring to FIG. 13, a hologram device 17 may be used instead of the prism 16 shown in FIG. 12. The parts corresponding to those of the embodiment shown in FIG. 12 are denoted with like numerals without repeating the description of such parts. This arrangement also allows the light emitted from the laser diode 1c to project a laser beam LB in a similar manner as those of the foregoing embodiments via the hologram device 17. At the same time, the moveable holder 15 (the hologram device 17) is made to undergo a swinging motion as indicated by arrow A to scan the laser beam LB. This embodiment also provides a similar effect.

Figure 14:
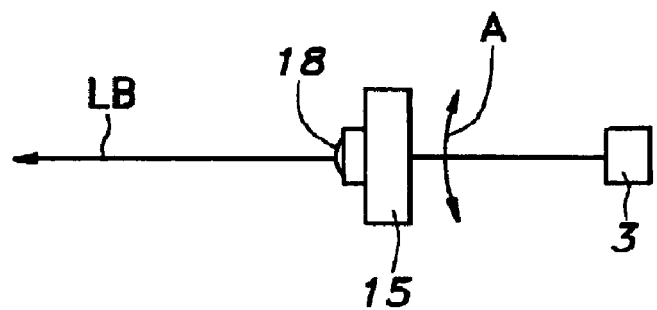
FIG. 14 is a diagram showing an embodiment using a laser emitting device as the optical element.

Referring to FIG. 14, a light emitting device 18 such as a laser diode serving as a laser light emitting device may be provided on the moveable holder 15, instead of the prism 16 used in the embodiment shown in FIG. 12. In this case, a laser beam LB is directly emitted from the light emitting device 18 of the moveable holder 15. At the same time, the moveable holder 15 (the light emitting device 18) is made to undergo a swinging motion as indicated by arrow A to scan the laser beam LB. This embodiment also provide a similar effect, and allows the part surrounding the movable part to be made both simple and compact without acquiring the laser diode 1c to be provided outside the scan unit 1a.

Figure 15:
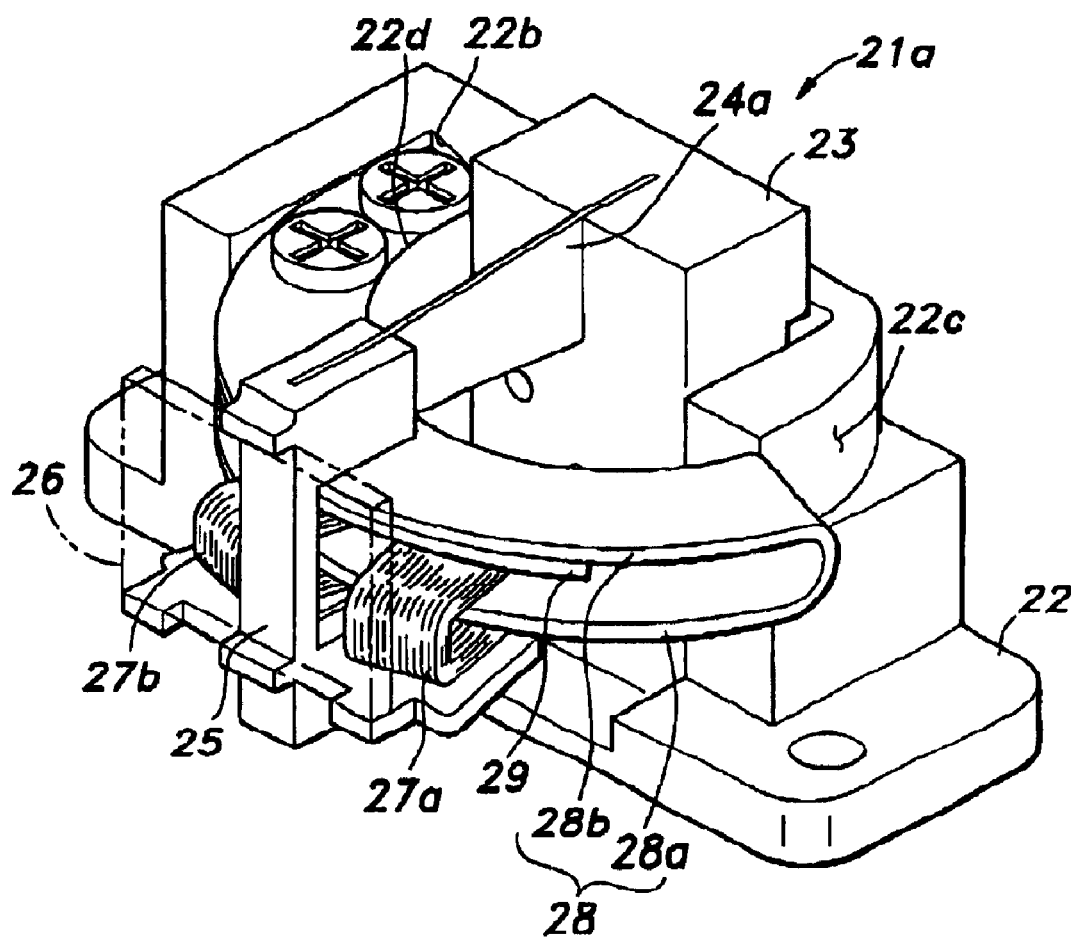
FIG. 15 is a schematic perspective front view showing an essential part of the scan unit 21a of a scan type laser radar unit 21 for a vehicle crash prevention system given as a second embodiment of the present invention.
Figure 16:
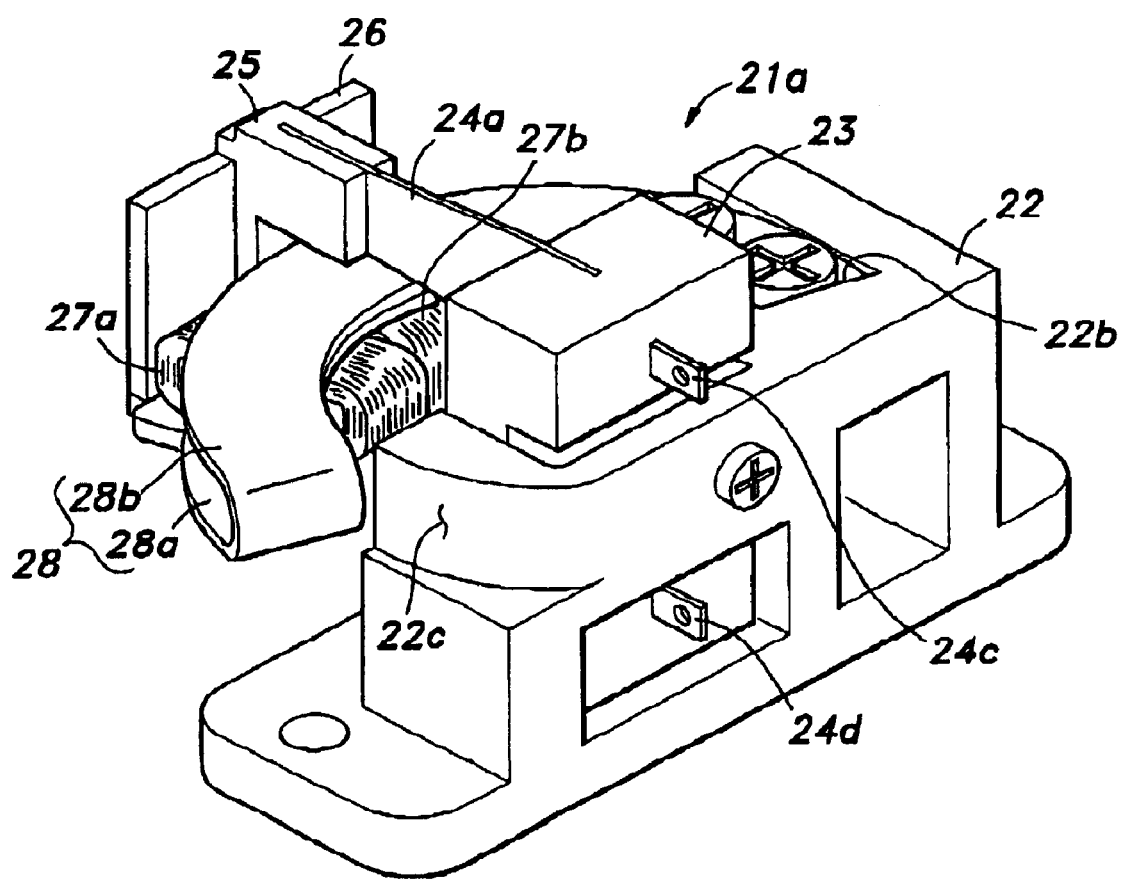
Figure 17:
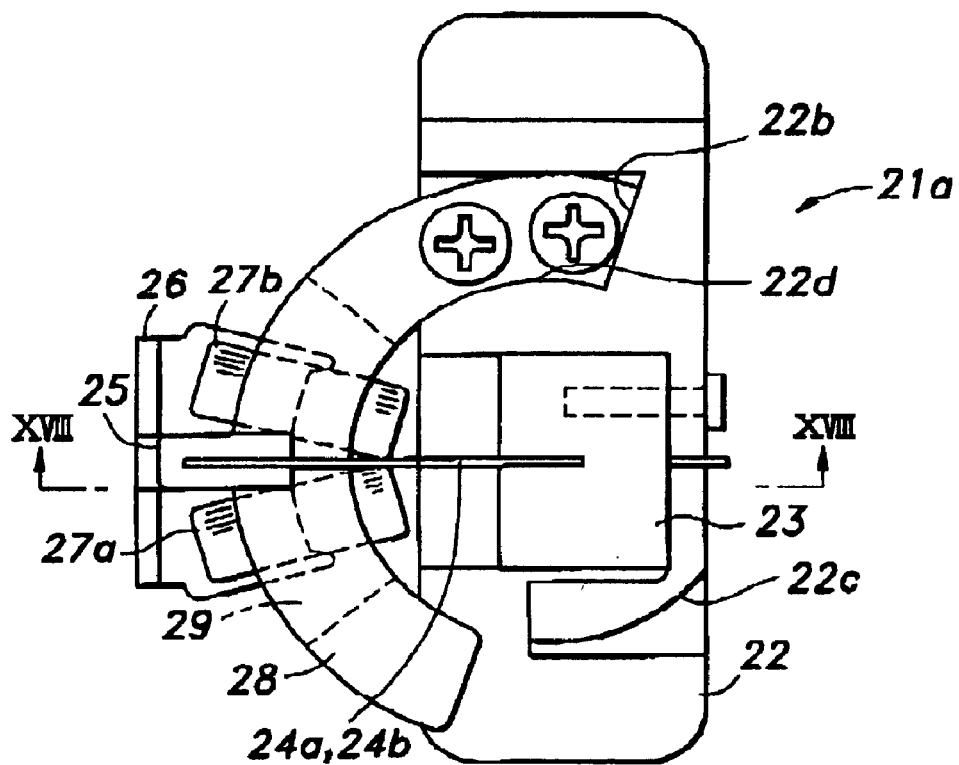
Figure 18:
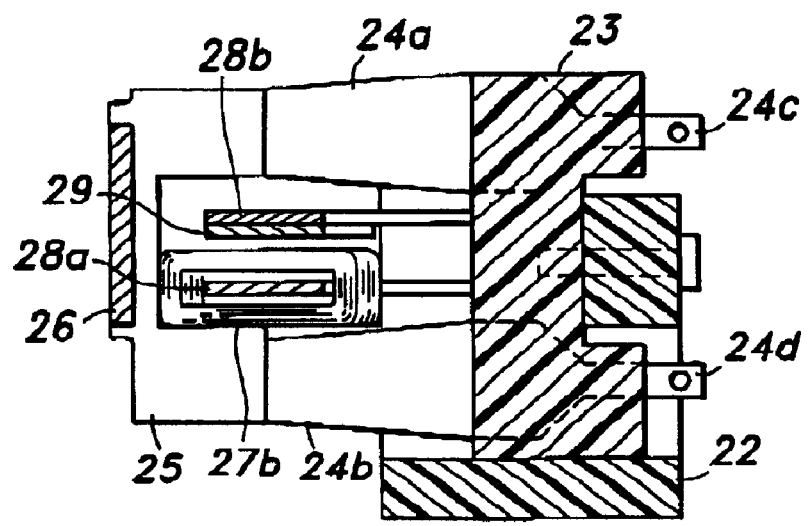
FIG. 18 is a cross sectional view taken along line XVIII—XVIII of FIG. 17.
Figure 19:
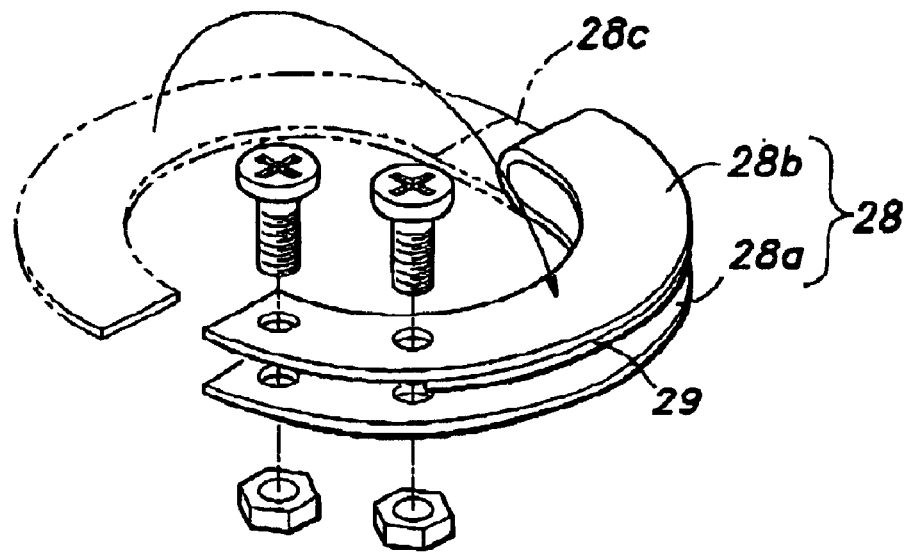

FIG. 15 is a schematic perspective front view of an essential part of the scan unit 21a of a scan type laser radar unit for a vehicle crash prevention system, and FIG. 16 is a schematic perspective rear view of the same. FIG. 17 is a plan view of the same, and FIG. 18 is a sectional side view taken long line XVIII—XVIII of FIG. 17. As the overall structure of the a scan type laser radar unit for a vehicle crash prevention system is similar to that of the first embodiment, the illustration and description of the same are omitted. As shown in these drawings, a fixed part 23 having a C-shaped side view is attached to a base 22 which is adapted to be attached to a casing of a scan type laser radar unit 1, for instance. One end (base end) of each of a pair of upper and lower sheet spring members 24a and 24b is attached to the fixed part 23. Three or more sheet spring members may be used in practice, but it is preferable to determine the number so that the electromagnetic force generating unit may be located substantially at the gravitational center of the moveable part. The sheet spring members 24a and 24b are arranged in parallel to each other so that their major surfaces are located on a same plane. The other ends or moveable ends of the sheet spring members 24a and 24b fixedly support a mirror holder 25 serving as a retaining part. The mirror holder 25 retains a single mirror 26 Serving as an optical element in such a manner that the major surface of the mirror 26 extends perpendicularly to the major surface of the sheet spring members 24a and 24b. Each of the sheet spring member 24a and 24b is provided with a width which gets progressively narrower from the fixed end (base end) toward the other or moveable end thereof. Thereby, the stress of each of the sheet spring members functioning as a cantilever can be distributed evenly within the sheet spring member, and the space for accommodating the electromagnetic force generating unit can be ensured in an efficient manner. Because the sheet spring members 24a and 24b arranged above and below the electromagnetic force generating unit in a spaced relationship, the rigidity against rolling motion can be improved making the assembly less susceptible to external influences.

The mirror 26 reflects the detecting light beam from the laser diode 21c to the outside as shown in FIG. 1, and may consist of glass, plastic or light metallic material such as aluminum. The surface (mirror surface) of the mirror 26 is provided with a reflective layer, for instance formed by depositing aluminum, having a smooth surface. The surface of the reflective layer is coated by a protective layer consisting of $SiO_2$ or other thin film for the protection against corrosion and oxidization.

A pair of electromagnetic coils 27a and 27b forming an electromagnetic force generating unit serving as a drive means are attached to the mirror holder 25 in such a manner that the drive force may act substantially upon the gravitational G of the moveable part which includes the electromagnetic coils 27a and 27b, mirror holder 25 and mirror 26.

An arcuate yoke 28 having a lower part 28a which is fitted into the electromagnetic coils 27a and 27b is attached to the base 22. The arcuate yoke 28 comprises a lower part 28a and an upper part 28b which are spaced from each other and formed by bending a substantially annular member provided with a bending section 28c. A magnet 29 is fixedly attached to the surface of the upper part 28b facing the lower part 28a. The free ends of the upper and lower parts 28a and 28b remote from the bending section 28c are attached to a yoke retaining part 22a by interposing the same and passing fasteners made of magnetic material such as threaded bolts through them so as to define a magnetically closed structure. Therefore, a magnetic flux extends between the magnet 29 and the lower part 28a of the arcuate yoke 28, and a drive force is produced by the electromagnetic coils 27a and 27b in the direction to cut across the magnetic flux as electric current is supplied to the electromagnetic coils 27a and 27b.

In practice, the upper and lower parts 28a and 28b of the arcuate yoke 28 can also be formed by joining one ends a pair of semicircular members, and bending the assembly into two halves. By thus forming the lower part 28a and upper part 28b in advance, the positional ends of the two parts can be accommodated to a certain extent during the fabrication process, and the assembly work can be simplified while reducing the required number of component parts as compared to the case where the lower part 28a and upper part 28b are positioned as a separate member when assembling the scan unit 21a.

The drive force produced by this magnetic circuit causes a swinging (scanning) motion to the mirror bolder 25 (mirror 26) about the pivot point at which the sheet spring members 24a and 24b are supported by the rectangular post 23. Because the drive force acts upon the gravitational center G of the moveable part as mentioned earlier, the drive efficiency is improved, and undesirable behaviors which are otherwise caused by the imbalance in moments can be avoided. Also, because the electromagnetic coils 27a and 27b which are relatively light among the components of the electromagnetic force generating unit are provided on the moveable part, the responsiveness and power efficiency can be both improved.

As shown in FIG. 15, electrode terminals 24c and 24d integral with the sheet spring members 24a and 24b project from the back side of the fixed part 23. These electrode terminals 24c and 24d are connected to the scan unit control circuit 21b and the free ends (moveable ends) of the sheet spring members 24a and 24b are connected to the electromagnetic coils 27a and 27b so that electric currant is supplied to the electromagnetic oils 27a and 27b via the electrode terminals 24c and 24d and sheet spring members 24a and 24b. Therefore, there is no need to attach an additional wiring member such as a flexible printed circuit board to the sheet spring members 24a and 24b, and the impairment of the responsiveness and generation of unwanted vibration modes due to the additional rigidity provided by such a wiring member can be avoided. Because the electrode terminals 24c and 24d are very small and thermally highly conductive, the soldering work for the connection can be conducted in an efficient manner.

The sheet spring members 24a and 24b may be formed by stamp forming or etching a thin plate member made of beryllium copper, phosphorus copper or stainless steel.

Viscoelastic material is bonded to the surfaces of the sheet spring members 24a and 24b to provide an appropriate damping action to the moveable part. Therefore, a damage to the device due to resonance can be avoided, and spurious vibrations due to external disturbances can be avoided. Also, the electromagnetic coils 27a and 27b are not required to produce a large braking force at each point of reversing the swinging motion, and this contributes to the saving of the electric power consumption and the increase in responsiveness.

The fixed part 23 and mirror holder 25 may be made by injection molding engineering plastic which is both light and rigid such as LCP (liquid crystal polymer) and PPS (polyphenylene sulfide) filled with glass fibers.

The sheet spring members 24a and 24b may be attached to the fixed part 23 and mirror holder 25 after these parts are molded. Alternatively, the sheet spring members 24a and 24b may be integrally formed with the fixed part 23 and mirror holder 25 by using the sheet spring members 24a and 24b as insert members. By so doing, the positional precision can be improved as compared to the case where the sheet spring members 24a and 24b are attached to the fixed part 23 and mirror holder 25 after these parts are molded. It is also possible to form the two sheet spring members as a one-piece member provided with a connecting part (not shown in the drawing) by stamp forming or etching, and remove this connecting part after the fixed part 23 and mirror holder 25 are integrally molded with the sheet spring members 24a and 24b.

Figure 20:
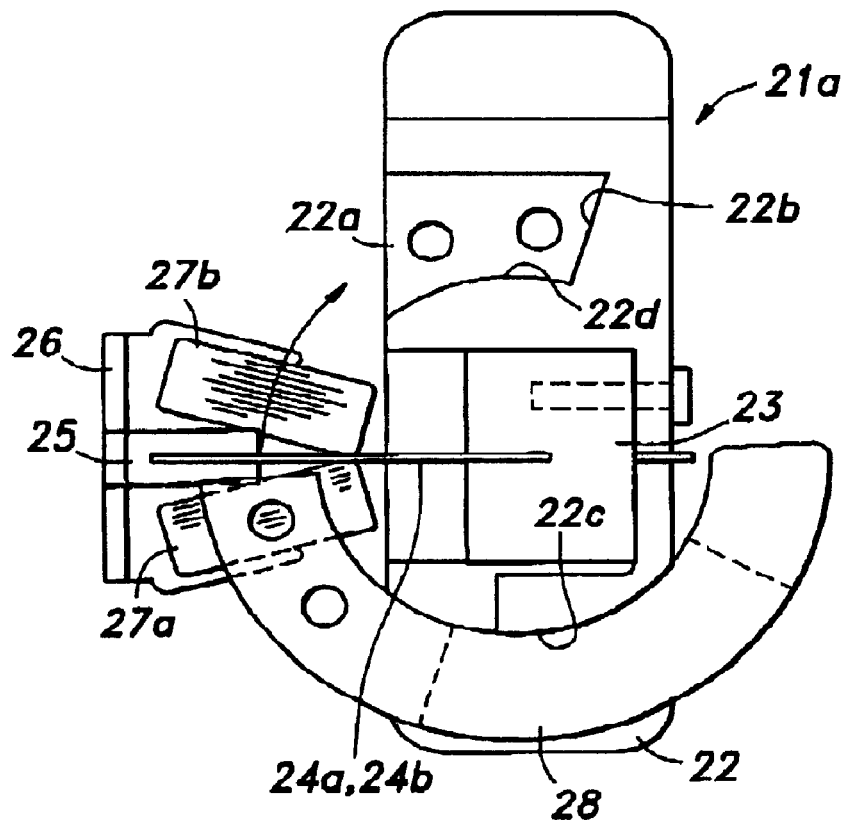
Figure 21:
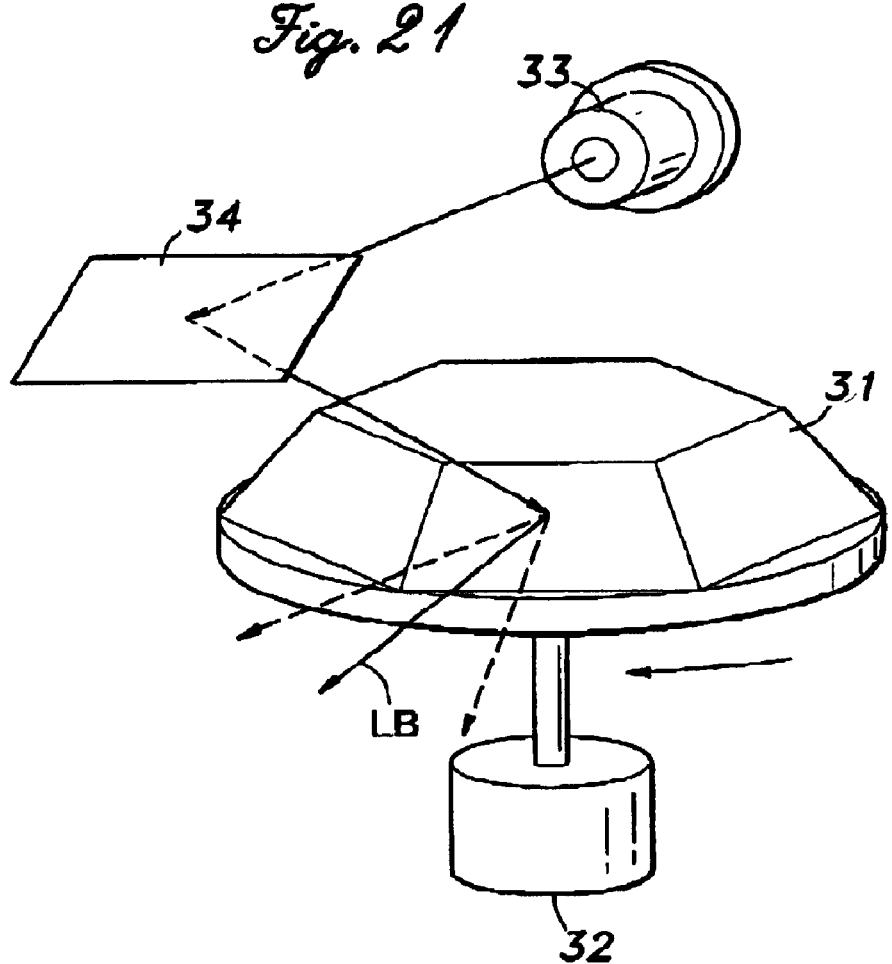
FIG. 21 is a schematic perspective view showing a conventional polygon mirror type laser actuator.
Figure 22:
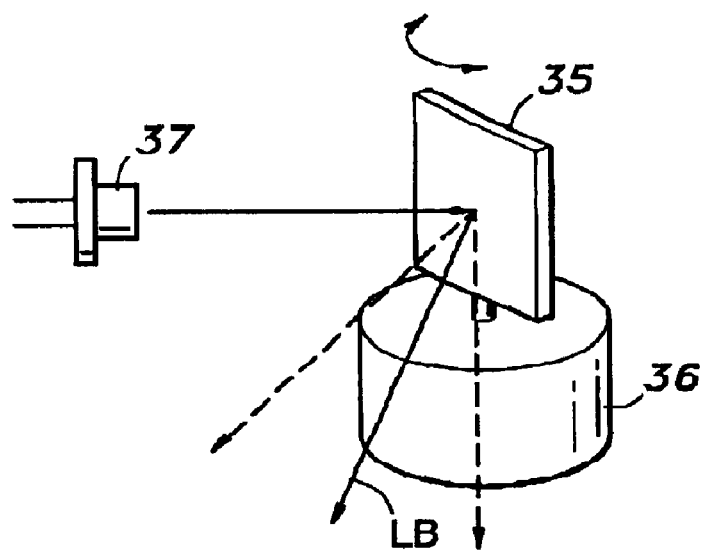
FIG. 22 is a schematic perspective view showing a conventional single mirror type laser actuator.

Referring to FIG. 20, the mode of assembling the scan unit 21a is described in the following. First of all, the fixed part 23, sheet spring members 24a and 24b and mirror holder 25 are fixedly attached to each other, and the electromagnetic coils 27a and 27b are fixedly attached to the mirror holder 25 by using a bonding agent. The fixed part 23 is then attached to the base 22. The lower part 28a of the arcuate yoke 28 is fitted into the electromagnetic coils 27a and 27b, and the yoke 28 is fixedly attached to the yoke retaining part 22a of the base 22 with the yoke retaining part 22a interposed between the lower part 28a and upper part 28b and the end surfaces thereof abutting the stopper surface 22b of the bass 22. At this point, because the base 22 is provided with guide surfaces 22e and 22d for guiding the inner circumferential surface of the arcuate yoke 28, the assembling and positioning work of the arcuate yoke 28 is simplified.

According to the scanning type laser radar unit 21 incorporated with the scan unit 21a described above, the laser diode 21c consists of a near infrared (having a wavelength in the order of 900 nm) pulse laser diode, and produces light pulses each having a duration in the order of a few ∥m according to the control signal from the light emitting device lighting circuit 21d. The detecting light from the laser diode 21c is reflected by the mirror 26 of the scan unit 21a, and is emitted to the outside as a detecting light beam LB.

The two electromagnetic coils 27a and 27b receive a supply of electric current corresponding to the control signal from the scan unit control circuit 21b, and the mirror holder 25 (mirror 26) swings about the axial line of the rectangular post 23 according to the polarity and amplitude of the electric current. As the angle of the reflective surface of the mirror 6 changes, the detecting light beam LB emitted to the outside as a reflected light beam undergoes a scanning or sweeping action. The electric current typically consists of an alternating current having a frequency in the order of 30 Hz. This alternating current may be PWM controlled if necessary.

The scan unit 21a serving as a laser actuator forms a spring-mass swing, and is given with a first order resonant frequency $f_0$ which is higher than the operating frequency (scanning frequency) $f_s$ to achieve a favorable.

Although the optical element consisted of a mirror in the foregoing embodiment, the optical element may also comprise a prism. In this case, because the swinging angle of the moveable holder can be relatively reduced for the given scanning angle θ that is required for the detecting light beam LB emitted via the prism, the detecting light beam LB can be scanned by using a relatively small power. This contributes to a compact design and a lower power consumption. The optical element may also consist of a hologram device. It is also possible that the optical element comprises a laser light emitting device. In such a case. a detecting light beam LB can be emitted directly from the light omitting device, and the part surrounding the movable part can be made highly compact because there is no need for laser beam emitting means to be provided outside the scan unit 1a.

Thus, according to the present invention, a spring-mass system is formed in which the moveable part retaining the optical device acts as the mass, and the first order resonant frequency of the system may be selected so as to be higher than the operating frequency (scanning frequency) A bearing for a sliding part is not required. and the resistance loss can be thereby eliminated. These factors contribute to a favorable responsiveness. Also, by properly designing the sheet spring, such as controlling the bending stress of the sheet spring which arises during operation below the fatigue limit, a lighter and more compact design is enabled than would be possible with the conventional arrangement using a polygon mirror. Because the moveable part is directly actuated while requiring fewer component parts, and the structure is simplified, a highly low cost design is possible.

By providing a plurality of drive force generating devices symmetrically about the optical device, and coinciding the composite drive force with the gravitational center of the moveable part, the drive efficiency can be improved while saving energy and achieving a high level of responsiveness. An electromagnetic coil which is a relatively light part of the electromagnetic force generating unit may be provided on the moveable part so that the mass of the moveable part may be minimized. The optical element may comprise a mirror for reflecting detecting light emitted from laser light emitting means. The mirror may consist of a single mirror and a reflective surface thereof may be swung through a swinging motion of the sheet spring so that the scanning of the detecting light can be accomplished with a simple structure.

By using a prism as the optical device, the swing angle of the moveable part can be reduced for a given swing angle of the detecting light, and the required scanning of the detecting light can be achieved by using a relatively small drive force. By using a hologram device as the optical device, a similar result can be achieved. By using a laser light emitting device as the optical device, the detecting light can be produced directly from the moveable part, and the need for an external laser light emitting means can be eliminated. This allows a compact design of the part surrounding the moveable part.

By connecting the sheet spring to the fixed part via a flexible circuit board for supplying electric current to the electromagnetic coils, a damping action can be produced from the flexible circuit board, and the responsiveness can be improved. In particular, by laminating an electrically insulating layer and an electroconductive layer for supplying electric current to the electromagnetic coils, the electroconductive circuit for supplying electric current can be formed at the same time as forming the sheet spring, and the assembly work such as wiring can be simplified.

Also, by affixing a viscoelastic sheet or other vibration control material is applied to a part of the sheet spring demonstrating a relatively high strain at the time of resonance, the resonance property can be favorably controlled at low cost and without substantially increasing the mass of the system.

If the drive means consists of an electromagnetic force generating unit, and the sheet spring comprises a plurality of sheet spring members disposed one next to another in a major plane of the sheet spring members with the electromagnetic force generating unit disposed between the sheet spring members in such a manner that a massive part of the moveable part is concentrated near the driving point thereof and the drive force acts substantially upon the gravitational center of the moveable part, it is possible to prevent undesirable behaviors due to the imbalance in monuments from occurring. Because the two sheet spring members are spaced from each other, a rigidity against rolling motion can be improved. Also, the number of component parts and the mass of the core can be reduced and a more compact and light-weight design is made possible as compared to the arrangement in which a pair of electromagnetic force generating devices are arranged above and below the single sheet spring member in a symmetric manner. Because each of the sheet spring members has a width which gets narrower from the fixed end to the moveable end, the stress can be distributed substantially uniformly over the sheet spring, and the space for accommodating the electromagnetic force generating unit can be favorably ensured.

What is claimed is:

1. An actuator for scanning detecting light, comprising:
   an optical element for emitting detecting light;
   a moveable part supporting the optical element;
   a sheet sprint having a fixed end and a moveable end supporting the moveable part for a movement of the moveable part along a substantially arcuate path centered about the fixed end of the sheet spring through a bending deflection of the sheet spring; and
   drive means for driving the moveable part along the substantially arcuate path so as to scan the detecting light, wherein the drive means is provided with a plurality of drive force generating units disposed on either side of the optical element in such a manner that the combined force of the drive force produced by the drive force generating units acts substantially onto the gravitational center of the optical element and moveable part.

2. An actuator for scanning detecting light, comprising:
   an optical element for emitting detecting light;
   a moveable part supporting the optical element;
   a sheet spring having a fixed end and a moveable end supporting the moveable part for a movement of the moveable part along a substantially arcuate path centered about the fixed end of the sheet spring through a bending deflection of the sheet spring, wherein a vibration control member is affixed to the sheet spring at a part where a relatively large strain is produced in a resonant vibration; and
   drive means for driving the moveable part along the substantially arcuate path so as to scan the detecting light, wherein the drive means consists of an electromagnetic force generating unit, and the moveable part comprises an electromagnetic coil.

3. An actuator for scanning detecting light according to claim 2, wherein the optical element comprises a member selected from a group consisting of a mirror for reflecting detecting light emitted from a laser light emitting means, a prism for refracting detecting light emitted from a laser light emitting means, a hologram element for reflecting detecting light emitted from a laser light emitting means, and a detecting light emitting device.

4. An actuator for scanning detecting light according to claim 2, wherein the sheet spring is connected to a fixed part via a flexible circuit board including a circuit for supplying electric current to the electromagnetic coil.

5. An actuator for scanning detecting light according to claim 2, wherein the sheet spring is provided with a laminated structure including an electrically insulating layer and an electrically conductive layer serving as a circuit for supplying electric current to the electromagnetic coil.

6. An actuator for scanning detecting light, comprising:
   an optical element for emitting detecting light;
   a moveable part supporting the optical element;
   a sheet spring having a fixed end and a moveable end supporting the moveable part for a movement of the moveable part along a substantially arcuate path centered about the fixed end of the sheet spring through a bending deflection of the sheet spring; and
   drive means for driving the moveable part along the substantially arcuate path so as to scan the detecting light, wherein the drive means consists of an electromagnetic force generating unit for driving the moveable part, and the sheet spring comprises a plurality of sheet spring members disposed one next to another in a major plane of the sheet spring members, the electromagnetic force generating unit being disposed between the sheet spring members.

7. An actuator for scanning detecting light according to claim 6, wherein the each of the sheet spring members has a width which gets narrower from the fixed end to the moveable end.

8. An actuator for scanning detecting light according to claim 6, wherein the electromagnetic force generating unit comprises an electromagnetic coil attached to the moveable part, the coil receiving a supply of electric current via a circuit partly formed by the sheet spring members.

9. An actuator for scanning detecting light according to claim 6, wherein the electromagnetic force generating unit comprises a yoke attached to the fixed part, the yoke including a C-shaped member which is folded onto itself to define a gap for receiving the electromagnetic coil.

10. An actuator for scanning detecting light according to claim 6, wherein the electromagnetic coil is provided with an annular shape, and the yoke is attached to the fixed pert so as to extend along the direction of movement of the moveable part and partly fitted into the electromagnetic coil,
the fixed part being provided with a guide part for guiding the yoke when fitting the yoke into the electromagnetic coil along the direction of movement of the moveable part and attaching the yoke to the fixed part.

11. An actuator for scanning detecting light according to claim 6, wherein the optical element comprises a member selected from a group consisting of:
a mirror for reflecting detecting light emitted from a detecting light emitting means;
a prism or lens for changing the optical direction of detecting light emitted from a detecting light emitting means;
a hologram for reflecting detecting light emitted from a detecting light emitting means; and
a detecting light emitting means itself.

12. An actuator for scanning detecting light, comprising:
an optical element for emitting detecting light;
a moveable part supporting the optical element;
a sheet spring having a fixed end and a moveable end supporting the moveable part for a movement of the moveable part along a substantially arcuate path centered about the fixed end of the sheet spring through a bending deflection of the sheet spring; and
drive means for driving the moveable part along the substantially arcuate path so as to scan the detecting light, the drive means including an electromagnetic force generating unit, wherein the electromagnetic force generating unit comprises a yoke extending along the arcuate path and attached to a fixed part, a magnet for supplying magnetic flux to the yoke, and an electromagnetic coil attached to the moveable part and receiving the yoke in a central bore thereof.

13. An actuator for scanning detecting light according to claim 12, wherein the yoke includes a C-shaped member which is folded onto itself to define a magnetic gap for receiving a part of the electromagnetic coil.

14. An actuator for scanning detesting light according to claim 12, wherein the sheet spring comprises a pair of sheet spring members disposed one next to another in a major plane of the sheet spring members, the two sheet springs providing an electric path for the electromagnetic coil.

15. An actuator for scanning detecting light according to claim 12, wherein the sheet spring is provided with a laminated structure including a pair of electroconductive strips electrically connected to the electromagnetic coil and an insulator for providing electric insulation to the electroconductive strips.

16. An actuator for scanning detecting light, comprising:
an optical element for emitting detecting light;
a moveable part supporting the optical element;
a sheet spring having a fixed end and a moveable end supporting the moveable part for a movement of the moveable part along a substantially arcuate path centered about the fixed end of the sheet spring through a bending deflection of the sheet spring; and
drive means for driving the moveable part along the substantially arcuate path so as to scan the detecting light, the drive means including an electromagnetic force generating unit, wherein the electromagnetic force generating unit comprises a pair of yokes extending along the arcuate path in a mutually parallel relationship and attached to a fixed part, a magnet for supplying magnetic flux to the yokes, and a pair of electromagnetic coils attached to opposing ends of the moveable part and each receiving a corresponding one of the yokes in a central bore thereof.

* * * * *